United States Patent
Mercuri

(10) Patent No.: US 7,094,311 B2
(45) Date of Patent: Aug. 22, 2006

(54) ASSEMBLING BIPOLAR PLATES

(75) Inventor: Robert Angelo Mercuri, Seven Hills, OH (US)

(73) Assignee: Advanced Energy Technology Inc., Lakewood, OH (US)

( * ) Notice: Subject to any disclaimer, the term of this patent is extended or adjusted under 35 U.S.C. 154(b) by 0 days.

(21) Appl. No.: 09/871,887

(22) Filed: Jun. 1, 2001

(65) Prior Publication Data

US 2002/0179230 A1 Dec. 5, 2002

(51) Int. Cl.
*B29C 65/00* (2006.01)

(52) U.S. Cl. .................... 156/307.1; 156/219; 429/36; 429/42

(58) Field of Classification Search ............... 156/209, 156/219, 293, 307.1, 307.3, 307.5; 429/34, 429/35, 36, 42
See application file for complete search history.

(56) References Cited

U.S. PATENT DOCUMENTS

| 3,404,061 | A |   | 10/1968 | Shane et al. ............... 161/125 |
| 4,014,730 | A | * | 3/1977 | Selover et al. ............. 156/307.3 |
| 4,234,650 | A |   | 11/1980 | Schieber .................... 428/280 |
| 4,416,955 | A | * | 11/1983 | Chi ............................ 429/26 |
| 4,565,749 | A | * | 1/1986 | van Ommering et al. ..... 429/27 |
| 4,720,316 | A |   | 1/1988 | Ruoff ......................... 156/242 |
| 4,732,637 | A | * | 3/1988 | Dettling et al. ............. 156/295 |
| 4,895,713 | A |   | 1/1990 | Greinke et al. ............. 423/448 |
| 5,589,301 | A | * | 12/1996 | Edgington et al. .......... 429/234 |
| 5,885,728 | A | * | 3/1999 | Mercuri et al. .............. 429/30 |
| 5,902,762 | A |   | 5/1999 | Mercuri et al. .............. 501/99 |
| 5,928,807 | A |   | 7/1999 | Elias .......................... 429/35 |
| 6,037,074 | A | * | 3/2000 | Mercuri et al. .............. 429/34 |
| 6,080,503 | A |   | 6/2000 | Schmid et al. ............... 429/35 |
| 6,432,336 | B1 | * | 8/2002 | Mercuri et al. .............. 264/51 |

OTHER PUBLICATIONS

EP 0 122 150 A2 (Englehard Corporation) Oct. 17, 1984.

* cited by examiner

*Primary Examiner*—Jeff H. Aftergut
*Assistant Examiner*—John L. Goff
(74) *Attorney, Agent, or Firm*—Waddey & Patterson; James R. Cartiglia

(57) ABSTRACT

Methods are provided for manufacturing bipolar graphite articles. First and second components are formed from flexible graphite material. The first component has a protrusion formed thereon, and the second component has a recess formed therein which is complementary to the protrusion of the first component. The first and second components are assembled so that the protrusion of the first component is received in the recess of the second component. Preferably, the components are made from uncured resin impregnated graphite material. The assembled components are then pressed together and heated to cure the resin so as to bond the components together.

17 Claims, 5 Drawing Sheets

ASSEMBLING BIPOLAR PLATES

TECHNICAL FIELD

The present invention relates to methods of constructing bipolar graphite materials, useful for and in applications such as flow field plates for use in an electro-chemical fuel cell.

BACKGROUND OF THE ART

A typical prior art construction for an electrochemical cell is described in U.S. Pat. No. 6,080,503, the details of which are incorporated herein by reference. Electrochemical cells comprising polymer electrolyte membranes (PEMs) may be operated as fuel cells wherein a fuel and an oxidant are electrochemically converted at the cell electrodes to produce electrical power, or as electrolyzers wherein an external electrical current is passed between the cell electrodes, typically through water, resulting in generation of hydrogen and oxygen at the respective electrodes of the cell. FIG. 1 illustrates a typical design of a conventional electrochemical cell comprising a PEM, and a stack of such cells. Each cell comprises a membrane electrode assembly (MEA) 5 such as that illustrated in an exploded view in FIG. 1a. MEA 5 comprises an ion-permeable PEM layer 2 interposed between two electrode layers 1,3 which are typically porous and electrically conductive, and comprise an electrocatalyst at the interface with the adjacent PEM layer 2 for promoting the desired electrochemical reaction. The electrocatalyst generally defines the electrochemically active area of the cell. The MEA is typically consolidated as a bonded laminated assembly. In an individual cell 10, illustrated in an exploded view in FIG. 1b, an MEA is interposed between a pair of separator plates 11, 12, which are typically fluid impermeable and electrically conductive. The cell separator plates are typically manufactured from non-metals such as graphite or from metals, such as certain grades of steel or surface treated metals, or from electrically conductive plastic composite materials. Fluid flow spaces, such as passages or chambers, are provided between the plate and the adjacent electrode to facilitate access of reactants to the electrodes and removal of products. Such spaces may, for example, be provided by means of spacers between separator plates 11, 12 and corresponding electrodes 1, 3, or by provision of a mesh or porous fluid flow layer between separator plates 11, 12 and corresponding electrodes 1, 3. More commonly channels (not shown) are formed in the face of the separator plate facing the electrode. Separator plates comprising such channels are commonly referred to as fluid flow field plates. In conventional PEM cells, resilient gaskets or seals are typically provided between the faces of the MEA 5 and each separator plate 11, 12 around the perimeter to prevent leakage of fluid reactant and product streams.

Electrochemical cells with a ion-conductive PEM layer, hereinafter called PEM cells, are advantageously stacked to form a stack 100 (see FIG. 1d) comprising a plurality of cells disposed between a pair of end plates 17, 18. A compression mechanism (not shown) is typically employed to hold the cells tightly together, maintain good electrical contact between components and to compress the seals. In the embodiment illustrated in FIG. 1c, each cell 10 comprises a pair of separator plates 11, 12 in a configuration with two separator plates per MEA. Cooling spaces or layers may be provided between some or all of the adjacent pairs of separator plates in the stack assembly. The stack may comprise a cooling layer interposed between every few cells of the stack, rather than between each adjacent pair of cells.

A bipolar flow field plate is an assembly of two individual flow field plate components. The bipolar flow field plate services two adjacent fuel cells, serving as the anode for one fuel cell and the cathode for the other. This reduces the number of components that must be assembled to create a fuel cell stack, thus simplifying the construction of the fuel cell stack.

The cell elements described have openings 30 formed therein which, in the stacked assembly, align to form fluid manifolds for supply and exhaust of reactants and products and, if cooling spaces are provided, for a cooling medium. Again, resilient gaskets or seals are typically provided between the faces of the MEA 5 and each separator plate 11, 12 around the perimeter of these fluid manifold openings to prevent leakage and intermixing of fluid streams in the operating stack.

FIG. 2 is an enlarged schematic cross-sectional view of the individual fuel cell of FIG. 1b, showing schematically channels such as 13 and 14 in the individual flow field plates 11 and 12.

FIG. 3 is a schematic representation of a typical prior art bipolar flow field plate in which two of the individual flow field plates such as 11 and 12 are placed back to back and are held together by an adhesive 15. In the process of manufacturing the prior art bipolar plate 16 of FIG. 3, a graphite mat would be prepared, then impregnated, dried, washed, baked, stenciled with adhesive 15 on the backs of the plates, then the two plates would be pressed together and heat cured to form the bipolar plate 16.

As noted, the separator plates or flow field plates 11 and 12 may be constructed from graphite material.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties that are highly directional e.g. thermal and electrical conductivity and fluid diffusion.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c"

direction, and thus form an expanded or intumesced graphite structure in which the laminar character of the carbon layers is substantially retained.

Graphite flake which has been greatly expanded and more particularly expanded so as to have a final thickness or "c" direction dimension which is as much as about 80 or more times the original "c" direction dimension can be formed without the use of a binder into cohesive or integrated sheets of expanded graphite, e.g. webs, papers, strips, tapes, foils, mats or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles and graphite layers substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 0.04 g/cc to about 2.0 g/cc. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude, for the "c" and "a" directions.

SUMMARY OF THE INVENTION

The present invention relates to methods of manufacturing bipolar graphite materials, useful for and in applications such as flow field plates.

In one embodiment, the method includes steps of:

(a) forming from graphite material, a first component having an operative side and a back side, and having a protrusion formed on its backside;

(b) forming from graphite material a second component having an operative side and a back side, and having a recess formed in its back side, the recess being complementary to the protrusion of the first plate component;

(c) assembling the first and second components so that the protrusion on the first component is received in the recess of the second component; and, in a preferred embodiment, (d) heating the assembled components so that the first and second components bond together at the protrusion and recess, respectively.

In one embodiment, the first and second components are formed by embossing a sheet of flexible graphite material.

In another embodiment, the first and second components are formed by compressing particulate graphite material.

In another embodiment of the invention, the method comprises the steps of:

(a) providing first and second sheets of a compressed mass of expanded graphite particles having first and second parallel opposed surfaces;

(b) impregnating the sheets with a resin to form uncured resin impregnated sheets;

(c) calendering the uncured resin impregnated sheets to form first and second calendered uncured resin impregnated sheets;

(d) embossing the first and second calendered uncured resin impregnated sheets, thereby:

(1) forming from the first sheet a first component having a protrusion defined thereon; and (2) forming from the second sheet a second component having a recess defined thereon;

(e) pressing the first and second components together with the protrusion of the first component received in the recess of the second component; and (f) curing the resin of the components and thereby bonding the first and second components together to form a bipolar plate.

Accordingly, it is an object of the present invention to provide improved methods for the manufacture of bipolar graphite sheets from graphite materials.

Another object is to provide simplified methods of manufacturing bipolar plates from graphite materials.

And another object is the provision of more rapid methods of manufacturing bipolar plates.

Still another object of the present invention is the provision of methods for manufacturing bipolar sheets having a lower electrical resistance as compared to plates made by prior art methods.

Other and further objects, features, and advantages will be readily apparent to those skilled in the art, upon a reading of the following disclosure when taken in conjunction with the accompanying drawings.

BRIEF DESCRIPTION OF THE DRAWINGS

FIGS. 1a–1d all illustrate prior art fuel cell assemblies.

DETAILED DESCRIPTION OF THE PREFERRED EMBODIMENTS

Figure 1A:
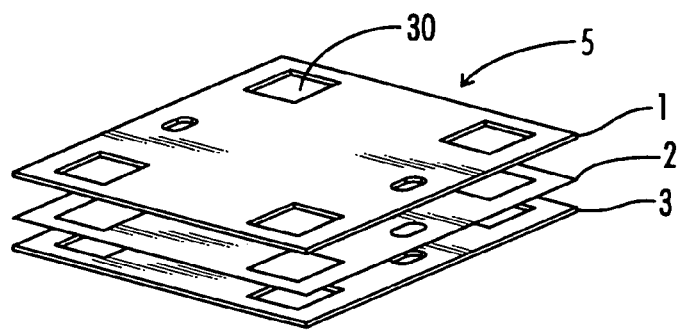
FIG. 1a is an exploded view of a membrane electrode assembly for a fuel cell.
Figure 1B:
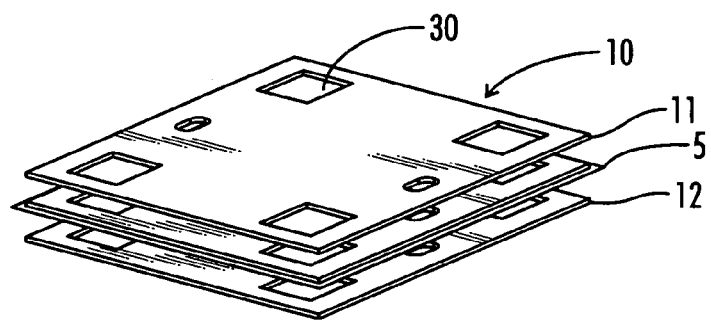
FIG. 1b is an exploded view of an individual cell of a fuel cell assembly.
Figure 1C:
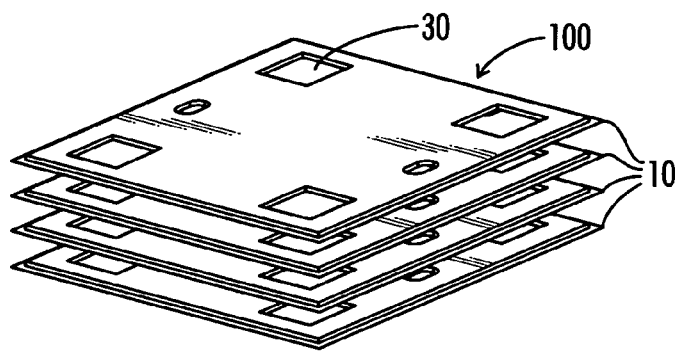
FIG. 1c is an exploded view of a plurality of stacked cells of a fuel cell assembly.
Figure 1D:
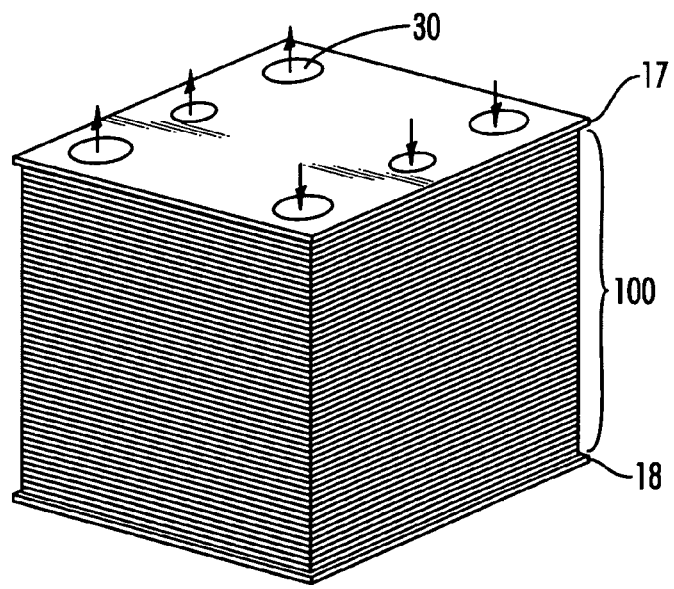
FIG. 1d is a perspective view of an assembled stack of fuel cells.
Figure 2:
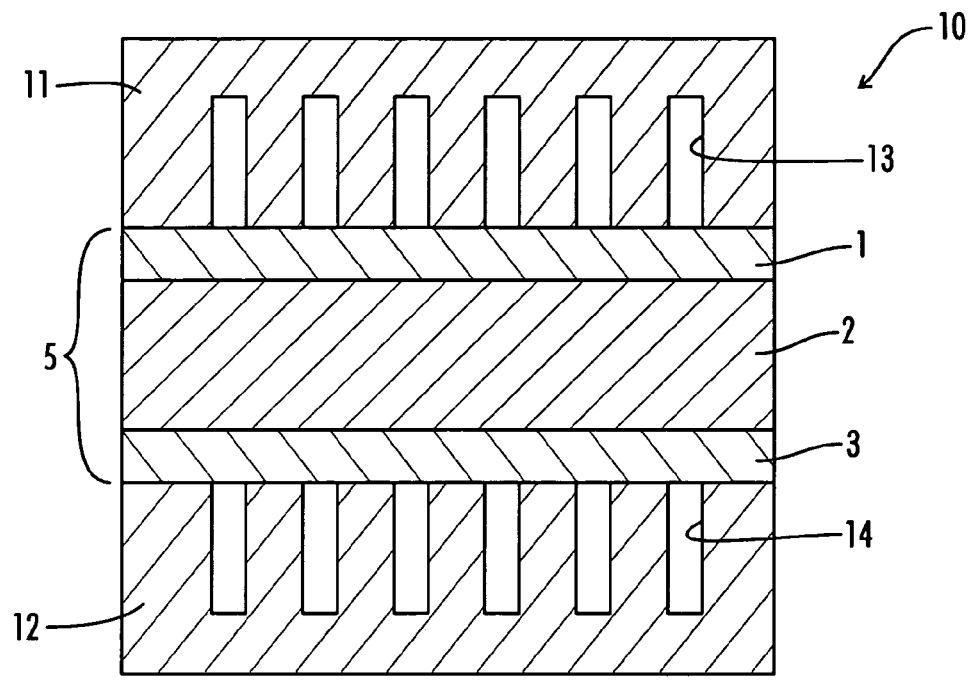
FIG. 2 is a schematic cross-sectional view of a single prior art fuel cell, corresponding to the subject matter of FIG. 1b.
Figure 3:
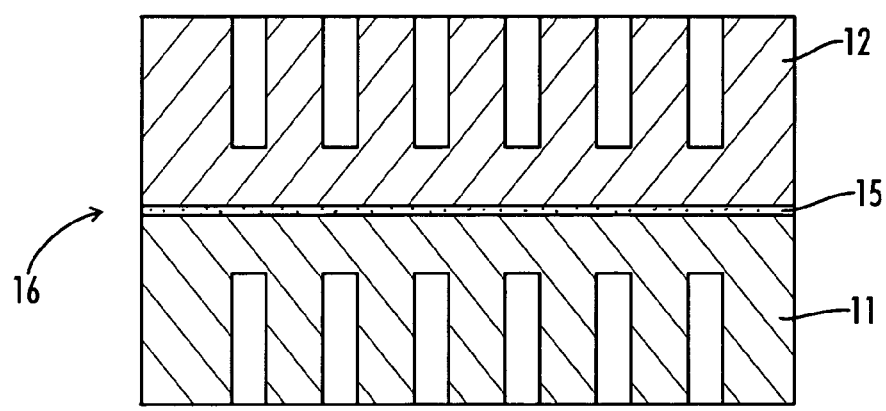
FIG. 3 is a schematic view cross-sectional view of a typical prior art manner of construction of a bipolar flow field plate from graphite materials.

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than twenty weight percent. More preferably, the graphite employed for the present invention will have a purity of at least about 94%. In the most preferred embodiment, the graphite employed will have a purity of at least about 99%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1,10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1, 4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.075 mm to 3.75 mm and a typical density of about 0.1 to 1.5 grams per cubic centimeter (g/cc). From about 1.5–30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, enhances the moisture resistance and handling strength, i.e. stiffness, of the flexible graphite sheet as well as "fixing" the morphology of the sheet. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, or mixtures thereof. Suitable epoxy resin systems include those based on diglycidyl ether or bisphenol A (DGEBA) and other multifunctional resin systems; phenolic resins that can be employed include resole and novolak phenolics.

As will be described below, some the methods of the present invention may include the forming of components for bipolar articles by either embossing flexible graphite sheet, molding flexible graphite sheet or by grinding up or comminuting flexible graphite sheet into particles, and then compressing the particles into a molded shape.

Once the flexible graphite sheet is prepared, it can then be comminuted by known processes or devices, such as a jet mill, air mill, blender, etc. to produce particles. Preferably, a majority of the particles have a diameter such that they will pass through 20 U.S. mesh; more preferably a major portion (greater than about 20%, most preferably greater than about 50%) will not pass through 80 U.S. mesh. It may be desirable to cool the flexible graphite sheet when it is resin-impregnated as it is being comminuted to avoid heat damage to the resin system during the comminution process.

The size of the comminuted particles should be chosen so as to balance machinability and formability of the graphite article with the thermal characteristics desired. Thus, smaller particles will result in a graphite article which is easier to machine and/or form, whereas larger particles will result in a graphite article having higher anisotropy, and, therefore, greater in-plane thermal conductivity. Accordingly, the artisan should in most instances employ the largest particles which permit forming and machining to the degree necessary.

Once the flexible graphite sheet is comminuted, it is compressed into the desired shape and then cured (when resin impregnated) in the preferred embodiment. Alternatively, the sheet can be cured prior to being comminuted, although post-comminution cure is preferred. Compression can be by die pressing, roll pressing, isostatic molding or other like compression processes. Interestingly, the isotropy/anisotropy of the final article can be varied by the compression (or molding) pressure, the particular molding process utilized and the size of the particles. For instance, die pressing will result in greater alignment of the graphene layers and, thus, a more anistropic final product, than isostatic molding. Likewise, an increase in molding pressure will also result in an increase in anisotropy. Thus, adjustment of molding process and molding pressure, as well as selection of comminuted particle size, can lead to controllable variations in isotropy/anisotropy. Typical molding pressures employed range from under about 7 Mega Pascals (MPa) to at least about 240 MPa.

Referring now to FIGS. 4–9, the methods of manufacturing a bipolar component for a fuel cell are described.

Figure 4:
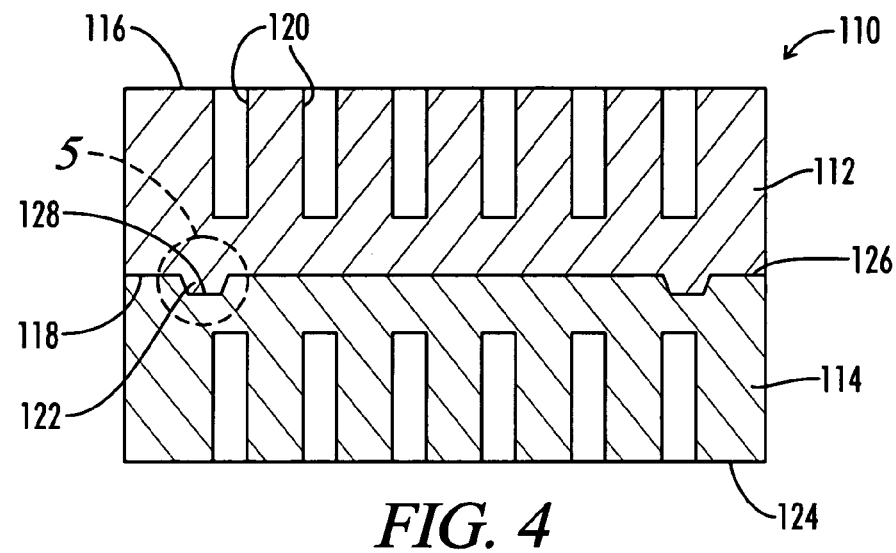
FIG. 4 is a schematic cross-sectional view of a bipolar flow field plate constructed from two graphite components utilizing the methods of the present invention.

In FIG. 4, a bipolar plate is schematically illustrated and designated by the numeral 110. To construct the bipolar plate 110, first and second components 112 and 114 are formed. As schematically illustrated in FIG. 4, the first plate component 112 has an operative side or first side 116 and a backside or second side 118. The operative side 116 has, for example, a plurality of channels such as 120 formed therein. The backside 118 has a protrusion 122 formed thereon.

Similarly, the second component 114 is formed with an operative side 124, a backside 126, and a recess 128 formed in the backside 126. The recess 128 is complementary to the protrusion 122. The protrusion 122 fits within the recess 128, and preferably the protrusion 122 closely and snugly fits within the recess 128.

Figure 5:
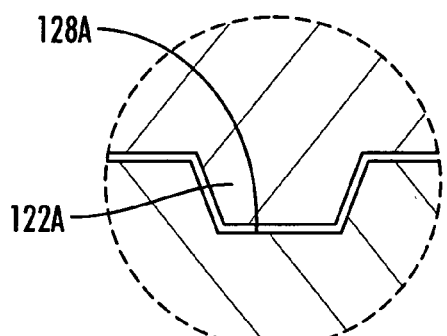
FIG. 5 is an enlarged view of the area of FIG. 4 encompassed within the dashed circular area showing one construction for a trapezoidal cross-section protrusion received in a complementary recess.
Figure 6:
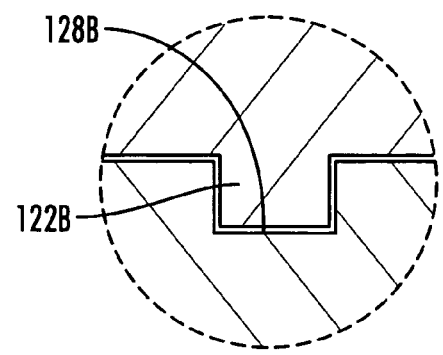
FIG. 6 is a view similar to FIG. 5 showing another construction of a protrusion and recess, this time having a rectangular cross-section.
Figure 7:
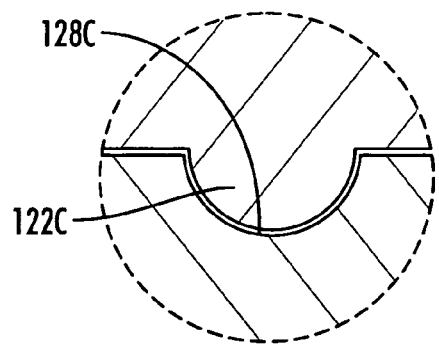
FIG. 7 is another view similar to FIG. 5, this time showing a protrusion and recess having a semi-circular or rounded cross-sectional shape.

FIGS. 5, 6 and 7 illustrate several possible shapes of the protrusion 122 and the recess 128, which are designated as 122A and 128A in FIG. 5 wherein the protrusion and recess are trapezoidal in cross-section. In FIG. 6, a rectangular cross-section protrusion 122B and recess 128B are illustrated. In FIG. 7, a rounded protrusion 122C and recess 128C are illustrated. Any other suitable shapes could be utilized for the protrusions and recesses.

Figure 8:
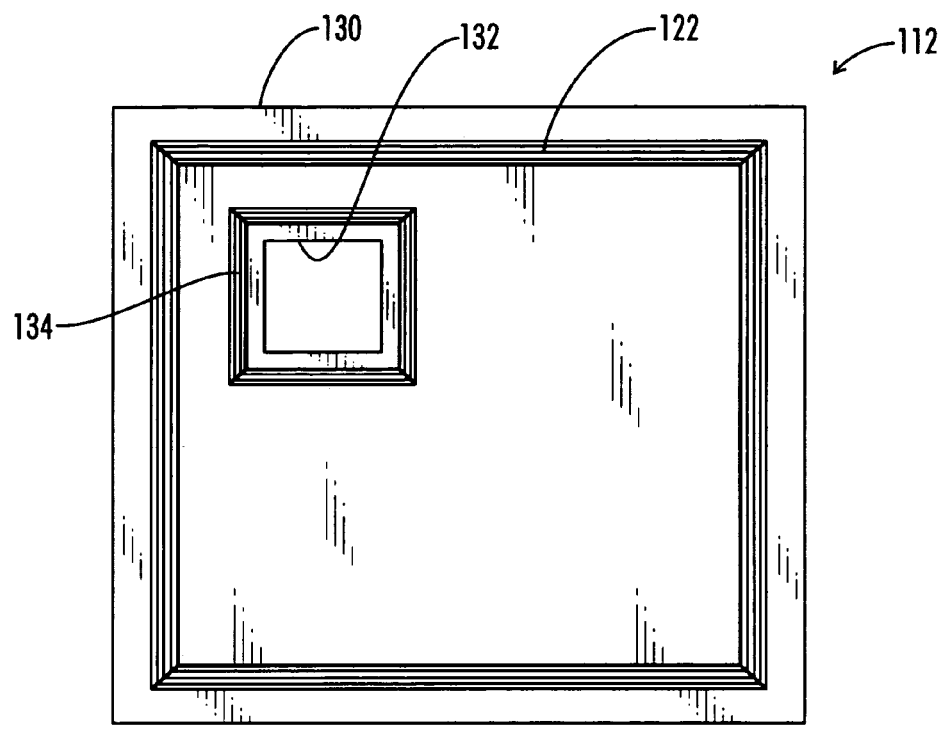
FIG. 8 is a schematic plan view of one of the flow field plate components of the assembly of FIG. 4.

FIG. 8 is a schematic bottom view of the first component 112 further illustrating the construction and location of the protrusion 122. The complementary recess 128 of the second component 114 would be similarly shaped and located. In FIG. 8, the protrusion 122 is shown to follow near to an outer perimeter 130 around the entire plate 112. It will be understood, however, that any suitable pattern of protrusions and complementary grooves can be utilized to achieve the necessary and desired bonding between the first and second components 112 and 114, as further described below. For example, the components may have openings therethrough, such as opening 132, and it may be desired to have a second protrusion 134 surrounding the opening and fitting within a complementary and similarly shaped second recess in the second component 114 so as to ensure a reliable sealing engagement between the two components 112 and 114 around the opening 132.

In order to form the completed bipolar article 110, the two components 112 and 114 are formed, and then are assembled together as shown in FIG. 4 so that the protrusion 122 is received within the recess 128. Then the assembled components are heated so that the protrusion 122 and recess 128, and also in some cases other abutting surfaces of the components 112 and 114 are bonded together.

Preferably, the first and second components 112 and 114 are formed of a resin impregnated graphite material and when the assembled components are heated, the resin in the resin impregnated graphite material is cured so as to provide the bond between the contacting surfaces of the components 112 and 114 and particularly between the protrusion 122 and recess 128. It is within the scope of the present invention, however, to form the components 112 and 114 from unimpregnated material or from cured resin impregnated material.

The individual components 112 and 114 may be formed by any suitable method. Particularly, they may be formed by embossing sheets of flexible graphite material, or they may be formed by molding particulate graphite material into the desired shape.

Figure 9:
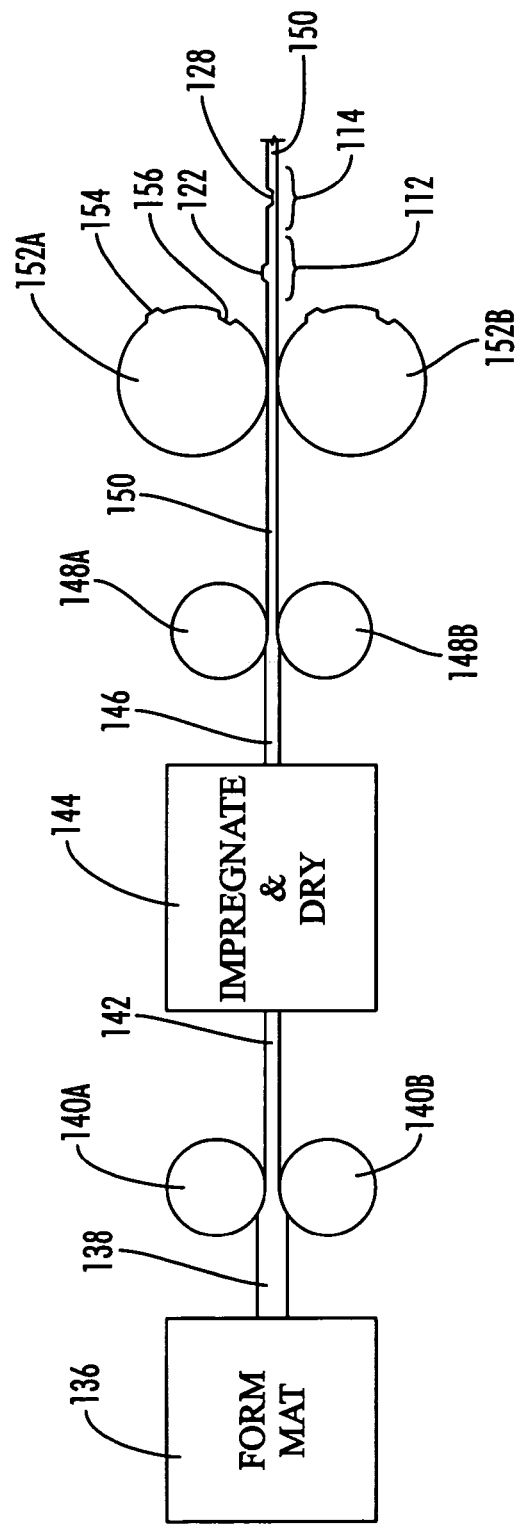
FIG. 9 is a schematic representation of the process of manufacture of the flow field plate components like that of FIG. 8.

Referring now to FIG. 9, the methods of forming the components by embossing sheets of flexible graphite material are schematically illustrated.

In FIG. 9, block 136 schematically illustrates the formation of a sheet of graphite mat material from the virgin particles of expanded graphite. The sheet of mat 138 then passes through a pair of pre-calendering rollers 140A and 140B to become a pre-calendered sheet 142. The pre-calendered sheet 142 then passes through a station 144 where the sheet of mat is impregnated with resin and dried to form an uncured resin impregnated sheet 146. The sheet 146 then passes through a pair of calendering rollers 148A and 148B to form a calendared uncured resin impregnated sheet 150. The sheet 150 then passes through a pair of embossing rollers 152A and 152B which are schematically illustrated as having patterns such as 154 and 156 defined thereon.

As the sheet of calendered uncured resin impregnated material 150 passes between the embossing rollers 152A and 152B, it is formed into the desired shape such as the first and second flow field plate components 112 and 114 having protrusion 122 and recess 128, respectively, defined thereon.

After the components 112 and 114 are shaped by the embossing rollers 152, the components 112 and 114 will be separated from the sheet 150. Then the components 112 and 114 will be assembled together as shown in FIG. 4 and pressed together and then heated to cure the resin material so as to bond the components 112 and 114 together to form the bipolar article 110.

Although the method has been illustrated in FIG. 9 as beginning with virgin particles of expanded graphite from which the mat is formed, it will be understood that one could also purchase previously manufactured flexible graphite sheet 150 and then emboss the same with roller embossers 152 or with other plate type embossing techniques.

Additionally, the components 112 and 114 can be molded from particulate material. As described above, sheets of flexible graphite material such as 150 can be ground up into particles and those particles can then be molded to any desired shape, such as the shapes 112 and 114, by any suitable conventional molding process such as die pressing, iso-static molding, or the like. Similarly, particles of expanded graphite (i.e., worms) can be molded into the form of components 112 and 114.

Thus it is seen that the methods of the present invention readily achieve the ends and advantages mentioned, as well as those inherent therein. While certain preferred embodiments of the invention have been illustrated and described for purposes of the present disclosure, numerous changes may be made by those skilled in the art, which changes are encompassed within the scope and spirit of the appended claims.

What is claimed is:

1. A method of manufacturing a bipolar graphite article, comprising:
    (a) forming a first component having an operative side and a back side, and having a protrusion formed on its back side, the first component formed of a compressed mass of expanded graphite particles;
    (b) forming a second component having an operative side and a back side, and having a recess formed in its back side, the recess being complementary to the protrusion of the first component, the second component formed of a compressed mass of expanded graphite particles; and
    (c) assembling the first and second components so that the protrusion of the first component is received in the recess of the second component to form a bipolar graphite article.

2. The method of claim 1, wherein:
    step (a) comprises embossing a first sheet of resin-impregnated compressed mass of expanded graphite particles to form the first component.

3. The method of claim 2, wherein the sheet of resin-impregnated compressed mass of expanded graphite particles is uncured at the time of step (a).

4. The method of claim 3, which further comprises curing the resin-impregnated compressed mass of expanded graphite particles.

5. The method of claim 1, wherein:
    step (a) comprises compressing a particulate resin impregnated compressed mass of expanded graphite particles.

6. The method of claim 5, wherein the resin impregnated compressed mass of expanded graphite particles is uncured at the time of step (a).

7. The method of claim 6, which further comprises curing the resin impregnated compressed mass of expanded graphite particles.

8. The method of claim 1, wherein:
    step (c) includes pressing the first and second components together.

9. The method of claim 8, wherein:
    in step (a), the compressed mass of expanded graphite particles is resin impregnated, uncured material; and curing occurs during the pressing step.

10. A method of manufacturing a bipolar article for a fuel cell, comprising:
    (a) providing first and second sheets of a compressed mass of expanded graphite particles, each sheet having first and second parallel opposed surfaces;
    (b) impregnating the sheets with a resin to form uncured resin impregnated sheets;
    (c) calendering the uncured resin impregnated sheets to form first and second calendered uncured resin impregnated sheets;
    (d) embossing the first and second calendered uncured resin impregnated sheets, thereby:
        (1) forming from the first sheet a first component having a protrusion defined thereon; and
        (2) forming from the second sheet a second component having a recess defined thereon;
    (e) pressing the first and second components together with the protrusion of the first component received in the recess of the second component; and
    (f) curing the resin of the first and second components and thereby bonding the first and second components together to form the bipolar article.

11. The method of claim 2 wherein step (b) comprises embossing a second sheet of resin impregnated compressed mass of expanded graphite particles to form the second component and further comprising heating the bipolar graphite article after said assembling.

12. The method according to claim 11 wherein a resin content of the first sheet of resin-impregnated compressed mass of expanded graphite particles comprises at least 5% by weight and up to 60% by weight and a resin content of the second sheet of resin-impregnated compressed mass of expanded graphite particles comprises at least 5% by weight and up to 60% by weight.

13. The method according to claim 12 wherein the resin content of the first sheet of resin-impregnated compressed mass of expanded graphite particles is about the same as the resin content of the second sheet of compressed mass of expanded graphite particles.

14. The method according to claim 11 wherein a density of the first sheet of resin-impregnated compressed mass of expanded graphite particles comprises 0.1 g/cc up to 1.5 g/cc and a density of the second sheet of compressed mass of expanded graphite particles comprises 0.1 g/cc up to 1.5 g/cc.

15. The method according to claim 14 wherein a density of the first sheet of resin-impregnated compressed mass of expanded graphite particles is substantially the same as the density of the second sheet of compressed mass of expanded graphite particles.

16. The method of claim 2 wherein step (b) comprises embossing a second sheet of resin impregnated compressed mass of expanded graphite particles to form the second component and further comprising bonding the first component to the second component after said assembling.

17. The method according to claim 16 wherein the bonding consists of heating up the bipolar graphite article.

* * * * *